Patented Oct. 15, 1946

2,409,402

UNITED STATES PATENT OFFICE 2,409,402

METHOD OF RECLAIMING

Harry H. Thompson and Derwin V. Moore, Akron, Ohio, assignors to Wingfoot Corporation, Akron, Ohio, a corporation of Delaware No Drawing. Application August 29, 1942, Serial No. 456,711

2 Claims. (Cl. 134—31)

This invention relates to a method of reclaiming rubber products, and more particularly to a method for treating articles composed of rubber and metal parts.

There are many types of commercial products in which both rubber and metal are employed. In many of these it becomes desirable after a certain amount of use to reprocess them. In some instances, the principal object is to recover the rubber and place it in re-usable form. In other cases, the principal object is to remove the rubber from the metal structure so that the latter can be rebuilt with fresh rubber. In some cases, both of these objects are important.

In the usual process for reclaiming rubber it is customary to chop up the worn rubber article and then subject the finely divided particles to a devulcanizing operation. Obviously, when the article to be reclaimed contains metal reinforcements or inserts, it is not readily susceptible to the conventional grinding and comminuting methods. Moreover, if chopping and grinding is resorted to, the metal parts will obviously be destroyed or damaged so that they cannot be reused.

One of the principal objects of the present invention is to recover rubber and metal from articles containing both in a form in which each of them is re-usable. Other objects and advantages will appear as the description proceeds.

Among the rubber-metal articles which are susceptible to treatment according to the invention are those in which rubber is adhered to metal through a coating of brass plate, rubber which is secured to metal by means of various adhesives, and rubber which is vulcanized to or around metal reinforcements or inserts by any other means.

According to the practice of the invention, the rubber-metal object is exposed to a mixture of steam and the vapor of a rubber softening oil at an elevated temperature. Such treatment in the vapor phase effects a relatively rapid penetration of the rubber and the rubber is softened and loosened from the metal so that the rubber and metal can be readily separated. The rubber is then in such condition that it can be processed on a refining mill to obtain a good quality reclaim rubber, and the metal parts, which have undergone little or no distortion, may be re-used directly or with relatively little further treatment and preparation.

The practice of the invention is illustrated by the following example. A section of a worn caterpillar track which was composed of a soft rubber wearing and flexing section vulcanized around and to metallic reinforcing bars and cables was suspended in the upper part of a pressure vessel containing, in its lower part, two gallons of rubber softening oil (coal tar light fractions) and two gallons of water. The vessel was closed and steam was then admitted into a surrounding steam jacket at about 200 lbs. gage pressure (385° F.). The pressure of the inside chamber rose to 160 lbs. per square inch and the temperature to 360° F. in about 45 minutes. The heating was continued for 24 hours and the vessel was then cooled and opened. The rubber portion of the treated article was very soft and was easily cut away and separated from the metal parts.

Various other rubber softening oils may be used in place of the coal tar oil of the foregoing example, including pine oil, petroleum hydrocarbons, and other materials known to be useful as rubber softening and reclaiming oils. The ratio of oil to water may also be varied as desired, the proportions being dependent in part upon the particular softening oil used and in part upon the temperature and time of reaction, the character of the product being reclaimed, and other factors present in the particular case. Any method for producing or maintaining the treating vapors may be employed, but care should be exercised so that condensed liquids do not cover the article being reclaimed, since it has been found that immersion in liquid is not nearly as effective as the desired vapor treatment. The temperature and time of treatment may also be varied considerably, one being to a large extent a function of the other and both being dependent upon the choice of softening oil, the character of the product treated, and other factors. In order to secure the desired result within reasonable time, the temperature should ordinarily be at least 300° F. Very satisfactory results are obtained between about 350° and 425° F. At least about 16 hours will ordinarily be required and 24 hours is usually sufficient to give optimum softening of the rubber and loosening of the bond between the rubber and the metal.

As previously stated, after the vapor treatment the metal parts are easily separated from the rubber. The softened devulcanized rubber can then be added to regularly devulcanized material and refined by standard methods, or be further treated by itself, while the metal parts may also be re-used, since the relatively low heat involved causes no appreciable injury.

We claim:

1. A method of separating metal from soft vulcanized rubber vulcanized thereto which comprises weakening the rubber-to-metal bond by exposing the metal-rubber object to a gaseous mixture of steam and the vapor of a rubber softening oil at a temperature of about 300–425° F. for at least about 16 hours, and thereafter separating the rubber from the metal.

2. A method of separating metal from soft vulcanized rubber vulcanized thereto which comprises weakening the rubber-to-metal bond by exposing the metal-rubber object to a gaseous mixture of steam and coal tar softening oil vapor at a temperature of about 300–425° F. for at least about 16 hours, and thereafter separating the rubber from the metal.

HARRY H. THOMPSON.
DERWIN V. MOORE.